United States Patent
Cao et al.

(10) Patent No.: US 12,458,437 B2
(45) Date of Patent: Nov. 4, 2025

(54) RADIO FREQUENCY ABLATION CATHETER HAVING FUNCTION OF MOVING GUIDE WIRE

(71) Applicant: SHANGHAI GOLDEN LEAF MED TEC CO., LTD., Shanghai (CN)

(72) Inventors: Hongguang Cao, Shanghai (CN); Meijun Shen, Shanghai (CN)

(73) Assignee: SHANGHAI GOLDEN LEAF MED TEC CO., LTD., Shanghai (CN)

( * ) Notice: Subject to any disclaimer, the term of this patent is extended or adjusted under 35 U.S.C. 154(b) by 663 days.

(21) Appl. No.: 17/813,043

(22) Filed: Jul. 18, 2022

(65) Prior Publication Data

US 2022/0346868 A1    Nov. 3, 2022

Related U.S. Application Data

(63) Continuation-in-part of application No. PCT/CN2021/072123, filed on Jan. 15, 2021.

(30) Foreign Application Priority Data

Jan. 16, 2020 (CN) .......................... 202010048418.5
Jan. 16, 2020 (CN) .......................... 202020095044.8

(51) Int. Cl.
*A61B 18/14* (2006.01)
*A61B 18/00* (2006.01)

(52) U.S. Cl.
CPC .................... *A61B 18/1492* (2013.01); *A61B 2018/00577* (2013.01); *A61B 2018/1437* (2013.01); *A61B 2018/1475* (2013.01)

(58) Field of Classification Search
CPC ...... A61B 18/1492; A61B 2018/00577; A61B 2018/1437; A61B 2018/1475; A61B 2018/00267; A61B 2018/00214
See application file for complete search history.

(56) References Cited

U.S. PATENT DOCUMENTS

| 2003/0176778 A1* | 9/2003 | Messing | A61B 18/00 600/374 |
| 2012/0157993 A1* | 6/2012 | Jenson | A61B 18/1492 606/41 |
| 2017/0189106 A1* | 7/2017 | Schuler | A61B 18/02 |

* cited by examiner

Primary Examiner — Adam Z Minchella
(74) Attorney, Agent, or Firm — George Guosheng Wang; Upstream Research and Patent LLC (57) ABSTRACT

A radio frequency ablation catheter having the function of a movable guide wire, comparing an electric support, a catheter body and a control handle which are sequentially provided. The catheter body is provided there with a cavity for the sliding of the movable guide wire. The distal end of the movable guide wire passes through the catheter body and protects from the distal end of the electric support, a soft guide wire provided at the distal end of the movable guide wire is always kept outside the electric support. The proximal end of the movable guide wire protects from the proximal end of the catheter body and enters the control handle, then, the proximal end of the movable guide wire is fixed to a controlling member provided on the control handle or is fixed to a controlling member provided outside the control handle.

6 Claims, 4 Drawing Sheets

RADIO FREQUENCY ABLATION CATHETER HAVING FUNCTION OF MOVING GUIDE WIRE

BACKGROUND

Technical Field

The invention relates to a radiofrequency ablation catheter having a movable guide wire, which belongs to the technical field of medical devices.

Related Art

Radiofrequency ablation technology is widely used in the medical field. The radiofrequency ablation catheter carrying multiple electrodes can greatly improve the radiofrequency efficiency.

At present, before the operation, the radiofrequency ablation catheter needs to enter the blood vessel with the help of the guide wire. Specifically, the guide wire is first sent to the target ablation area (such as branch vessels); The guide tube enters the human body along the guide wire and reaches the expected position; and the guide wire is extracted. Then, the radiofrequency ablation catheter with a electrode bracket in a compact state is sent to the target ablation position along the guide tube. The guide tube was then withdrawn and the electrode stent was expanded to make the electrodes adhere to a vessel wall for ablation. After the ablation, the electrode stent was compacted and then the radiofrequency ablation catheter was extracted.

When the position of the radiofrequency ablation catheter needs to be moved during the operation, it needs to be moved after entering the guide wire again. Especially, when multiple target ablation areas are need to be ablated in the one operation process, such as ablation of multiple sides or different branches of the blood vessels, it is necessary to extract the radiofrequency ablation catheter and then re-use the guide wire to guide the radiofrequency ablation catheter to enter another target area. Thus, it is necessary to insert and extract the guide wire for many times in one operation, which is time consuming. It is very inconvenient and increases the intraoperative risk.

In addition, the conventional guide wire is usually an accessory of the radiofrequency ablation catheter or a medical device independent to the radiofrequency ablation catheter. Therefore, the storage and management of the guide wire and the radiofrequency ablation catheter are carried out separately, which is inconvenient. In addition, the conventional guide wire has no auxiliary functions except for the guiding function.

SUMMARY

The technical problem to be solved by the invention is to provide a radiofrequency ablation catheter having function of movable guide wire.

In order to achieve the above technical purpose, the invention adopts the following technical scheme:

The utility model relates to a radiofrequency ablation catheter having a movable guide wire, comprising an electrode bracket, a catheter body and a control handle which are arranged in sequence, the catheter body being connected with the electrode bracket and the control handle at opposite ends thereof, wherein, the catheter body has a lumen for the movable guide wire sliding therein;

the movable guide wire passes through the catheter body and the electrode bracket, and has a distal end fixed outside the electrode bracket;

the movable guide wire passes the catheter body and enters the control handle, and is fixed to a controlling member in the control handle or outside the control handle;

the movable guide wire is movable forwardly or backwardly by the controlling member and the electrode bracket is accordingly changed between a compact state and an expanded state of the electrode bracket.

Preferably, the movable guide wire comprises a guide wire body and a soft guide wire arranged at a distal end of the guide wire body, and the soft guide wire is maintained outside the electrode bracket.

Preferably, the distal end of the movable guide wire is not fixed with the electrode bracket, and is movable relative to a distal end of the electrode bracket.

Preferably, the guide wire body has a first stop point at a distal end of the electrode bracket, which is limited outside the distal end of the electrode bracket, and the first stop point is used to expand the electrode bracket.

Preferably, the guide wire body, parallel to the electrode bracket, is provided with a second stop point, which is limited between the distal end and a proximal end of the electrode bracket, and the second stop point is used for compacting the electrode bracket.

Preferably, the guide wire body is provided with a first stop point out of the distal end of the electrode bracket, which is limited outside the distal end of the electrode bracket, and the first stop point is used to expand the electrode bracket;

the guide wire body parallel to the electrode bracket is provided with a second stop point, which is limited between the distal end and a proximal end of the electrode bracket, and the second stop point is used for contracting the electrode bracket.

Preferably, the guide wire body is fixed with the distal end of the electrode bracket close to the soft guide wire; or, the guide wire body is provided with a first stop point out of the distal end of the electrode bracket, and the first stop point is fixed with the distal end of the electrode bracket.

Preferably, the shape of the distal end of the soft guide wire is in shape of a straight lines, a curve, an arc or other shapes.

Preferably, the distal end of the soft guide wire extends at angle of 0-90 degrees.

Preferably, the guide wire body of the movable guide wire functions as a supporting wire.

Preferably, the electrode bracket is in shape of a mesh stent, a spiral bracket or a basket bracket, and is fixed with a plurality of electrodes.

The radiofrequency ablation catheter with the function of the movable guide wire provided by the invention, by combining the movable guide wire and the radiofrequency ablation catheter, eliminates the action of feeding and withdrawing the movable guide wire into and out of the radiofrequency ablation catheter, simplifies the operation of the movable guide wire, and facilitates the operation of the radiofrequency ablation catheter entering the target lumen before the operation, At the same time, it is convenient to move the radiofrequency ablation catheter during the operation. During the operation, the target ablation area can be guided by the soft guide wire set at the distal end of the movable guide wire without additional guide wire; In the process of moving after one side ablation, there is no need to extract the catheter, just retract the electrode bracket into the guide tube, so that the soft guide wire is exposed outside the guide tube, which is convenient for entering the branch blood vessels. When entering the branch vessel, you can enter the target branch vessel by moving or rotating the radiofrequency ablation catheter or moving or rotating the active guide wire. Through the above improvements, the operation time will be shortened, and there is no need to withdraw and insert the guide wire and radiofrequency ablation catheter frequently during the operation, which reduces the time and economic cost. More importantly, the radiofrequency ablation catheter can enter the human body at one time, and can be extracted after ablation in multiple places (left and right sides, or different branches of blood vessels), There is no need to extract in the middle of the operation to increase the risk and operation time.

DETAILED DESCRIPTION

The technical scheme of the invention will be further described in detail below in combination with the attached drawings and specific embodiments.

First Embodiment

Figure 1:
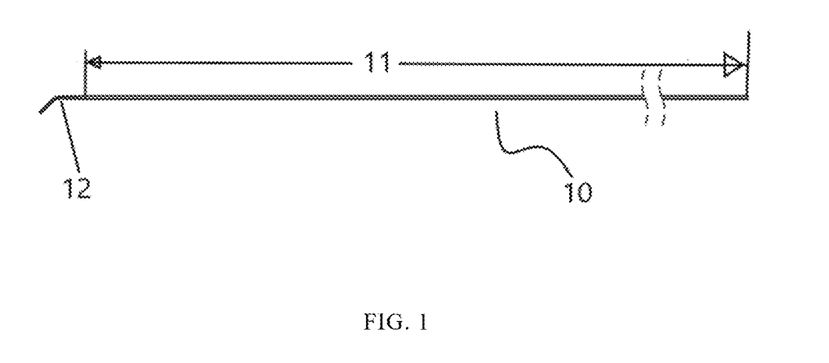
FIG. 1 is an illustrated structural diagram of a movable guide wire provided in a first embodiment of the radiofrequency ablation catheter described herein.
Figure 2:
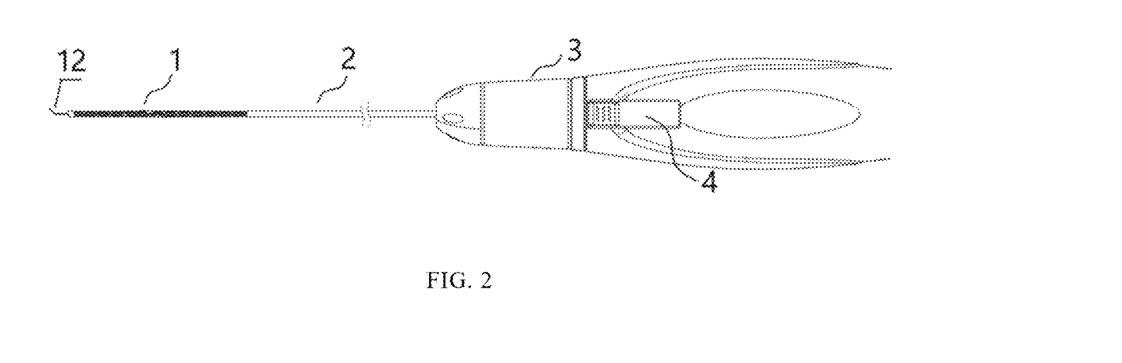
FIG. 2 is an illustrated structural diagram of a first embodiment of the radiofrequency ablation catheter, in which a electrode bracket is in a compact state, and a controlling member for controlling the movable guide wire is set on the control handle.

As shown in FIG. 1 and FIG. 2, the radiofrequency ablation catheter with a movable guide wire provided by the first embodiment of the present invention includes an electrode bracket 1, a slender catheter body 2 and a control handle 3 arranged in sequence, wherein both ends of the catheter body 2 are respectively connected with the electrode bracket 1 and the control handle 3. The end of the radiofrequency ablation catheter close to a patient is defined as a distal end, and the end of the radiofrequency ablation catheter close to an operator is defined as a proximal end. The electrode bracket 1 is arranged at the distal end of the catheter body 2, and the control handle 3 is connected to the proximal end of the catheter body 2.

Figure 4:
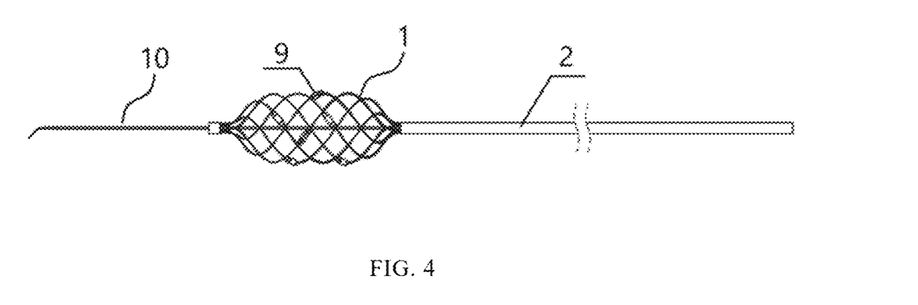
FIG. 4 is an illustrated structural diagram of the first embodiment of the radiofrequency ablation catheter, in which the electrode bracket is in an expanded state with a distal end of the movable guide wire is not fixed.
Figure 5:
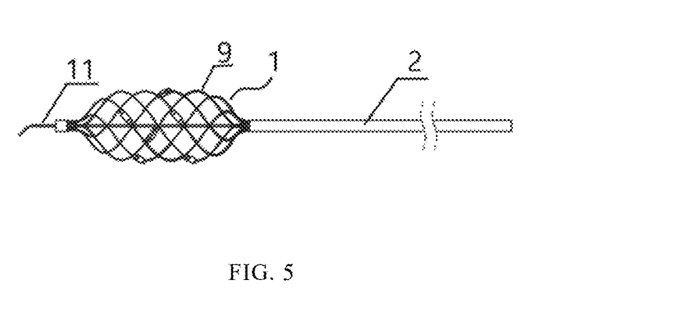
FIG. 5 is an illustrated structural diagram of the first embodiment of the radiofrequency ablation catheter, in which the electrode bracket is in an expanded state with the distal end of the movable guide wire and the distal end of the electrode bracket are fixed.

As shown in FIG. 4 and FIG. 5, the shape of the electrode bracket 1 can be a mesh stent. The mesh stent is a mesh stent with a predefined length. In the mesh stent, there is a grid formed by spiral braiding single wire in oppositive directions or spiral braiding multiple wires in oppositive directions. During the expansion of the mesh stent, the braided wires around each node provide supports for each other and are not easy to fall down.

The mesh stent can be preshaped or not preshaped before assembly, and the shape of the mesh stent can be deformed during assembly and expansion. After assembly, the overall shape of the mesh stent can be cylindrical or drum shaped.

After assembly, each end of the electrode bracket 1 is gathered together and connected to be a connecting tube respectively, thus forming a distal end 15 and a proximal end of the mesh stent. The middle segment of the mesh stent has a compact state and an expanded state. One or more electrodes 9 are attached to the braided wire of the middle segment of the mesh stent. The middle segment of the electrode bracket 1 can expand by itself in the target lumen of the ablation, or expand under the action of the wall-apposition-adjusting wire or the movable guide wire 10, so as to make the electrode 9 adhere to the wall. The electrode 9 can be a block electrode or a ring electrode, and the electrodes 9 protrude from the braided wire, making the electrode 9 fully contact with the wall of the target lumen and improving the adhesion effect.

The braided wire used for braiding the mesh stent can be metal material or polymer material, such as stainless steel or memory alloy. When the memory alloy is used to make the mesh stent, after the electrode bracket 1 reaches the target lumen within a guide tube, once the guide tube is removed, the electrode bracket 1 can realize self expansion by automatic deformation of the memory alloy. In order to improve the apposition effect of the electrode 9, the adhesion effect of the electrode bracket 1 can also be adjusted by pulling the wall-apposition-adjusting wire, So that it is suitable for lumens of different diameters. For the electrode bracket 1 without memory alloy, when the guide tube is removed, the expanded diameter of the mesh stent can be directly adjusted using the wall-apportion-adjusting wire to enable the electrodes apposition to the wall of the lumen. Of course, in other embodiments, the compaction and expansion of the mesh tube can also be realized by pulling the movable guide wire, thus eliminating the wall-apposition-adjusting wire.

The slender catheter body 2 is used to accommodate and support various wires and movable guide wires 10 of the radiofrequency ablation catheter, and the catheter body 2 can also be used to deliver gas or liquid to the target lumen at the distal end. The catheter body 2 can be a tube with multiple lumens, in which some of the lumens are used to accommodate radio-frequency wires, thermocouple wires and other wires to achieve the measurement function, and others of the lumens are used to accommodate a supporting wire, the wall-apposition-adjusting wire or the movable guide wire 10.

the movable guide wire 10 and the wall-apposition-adjusting wire can be accommodated in different lumens, or they can share a lumen. The lumen for accommodating the movable guide wire 10 extends centrically along the catheter body 2 or extends eccentrically. For example, the movable guide wire 10 is accommodated in a central lumen of the catheter body 2 or in a peripheral lumen of the catheter body 2.

A group of RF wires and thermocouple wires is fixed inside each electrode 9. The RF wire and thermocouple wire is fixed inside the electrode 9. The thermocouple wire is wrapped by insulating material to avoid the influence of high-frequency electricity. The RF wire and thermocouple wire extend from the distal end of the catheter body 2 to the control handle 3, Thus, they connect with a radiofrequency ablation device through an interface in the control handle 3.

The supporting wire is fixed inside the catheter body 2 to support the catheter body 2. When the strength of the guide wire body 11 of the movable guide wire 10 is enough, the guide wire body 11 can also support the catheter body 2, therefore, the guide wire body 11 of the movable guide wire 10 can be used as the supporting wire at the same time, and there is no need additional the supporting wire.

In the radiofrequency ablation catheter with a movable guide wire provided by the first embodiment, the movable guide wire 10 is integrated with the radiofrequency ablation catheter, and the movable guide wire 10 needn't to be pulled out during the operation, which is always kept inside the radiofrequency ablation catheter.

Figure 3:
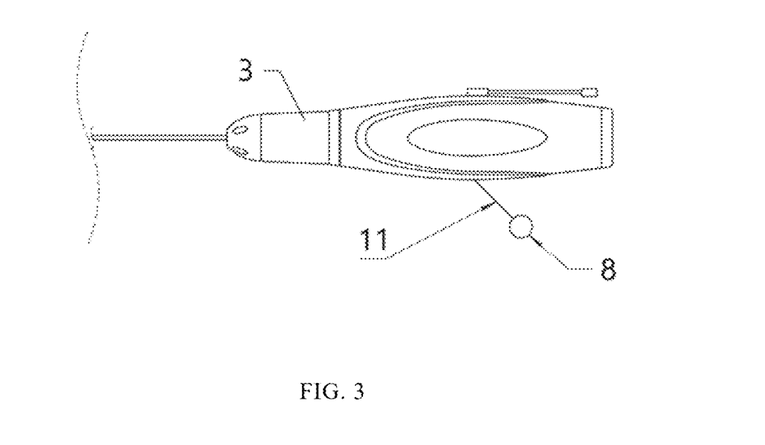
FIG. 3 is an illustrated structural diagram of an alternative embodiment of the controlling member, which is arranged outside the control handle.

Specifically, the catheter body 2 is provided with a lumen in which the movable guide wire slides. The movable guide wire 10 comprises a guide wire body 11 and a soft guide wire 12 arranged at a distal end of the guide wire body 11. As shown in FIG. 2, the distal end of the movable guide wire 10 passes through the catheter body 2 and extends from the distal end of the electrode bracket 1 and is always limited outside the distal end of the electrode bracket; The proximal end of the movable guide wire 10 passes through the proximal end of the catheter body 2 and enters the control handle 3. Then, the proximal end of the movable guide wire 10 is fixed to the controlling member 4 arranged on the control handle 3. The movable guide wire 10 moves forward or backward under the action of the controlling member 4 to change between the compact state and the expanded state of the electrode bracket 1. The control handle 3 can also have a structure as shown in FIG. 3, the proximal end of the movable guide wire 10 only passes through the control handle 3 and is fixed with the controlling member 8 arranged outside the control handle 3. The control handle 3 shown in FIG. 2 and FIG. 3 is also provided with another interface to fix RF wires, thermocouple wires and other wires and connecting the control handle with external RF ablation equipment.

As shown in FIG. 2, in this embodiment, by adjusting the length of the movable guide wire 10, the soft guide wire 12 at the distal end of the movable guide wire 10 can be maintained outside the electrode bracket 1. In other embodiments, the soft guide wire 12 can be maintained outside the electrode bracket 1 by a first stop point on the guide wire body 11. The first stop point is close to the soft guide wire 12 and is limited outside the distal end of the electrode bracket 1.

The soft guide wire 12 has a guiding function and is easy to enter branch vessels. The distal end of the soft guide wire 12 extends from the distal end of the movable guide wire 10 at an angle of 0-90 degrees. The shape of the distal end of the soft guide wire 12 can be anyone of a straight line, a curve, an arc and other shapes, including but not limited to L-shape, straight shape or U-shape, so as to reach the target lumen at different positions.

In this embodiment, the distal end of the movable guide wire 10 may or may not be fixed with the distal end of the electrode bracket 1. When the distal end of the movable guide wire 10 is not fixed with the distal end of the electrode bracket 1, the distal end of the movable guide wire 10 and the distal end of the electrode bracket 1 can slide relatively. When the distal end of the movable guide wire 10 is fixed with the distal end of the electrode bracket 1, the guide wire body 11 can be directly or indirectly fixed with the distal end of the electrode bracket 1 at a position close to the soft guide wire 12 by welding, adhesive, hot melting, etc. At this time, the movable guide wire 10 has the function of expanding and contracting the electrode bracket 1.

As shown in FIG. 4, when the distal end of the movable guide wire 10 is not fixed with the distal end of the electrode bracket 1, the distal end of the electrode bracket 1 slides freely with respect to the movable guide wire 10 during the contracting and expanding of the electrode bracket 1. The compact and expansion of the electrode bracket 1 can be realized by other ways. For instance, the expansion of the electrode bracket 1 is realized by pulling the wall-apposition-adjusting wire backward, and the compact of the electrode bracket 1 is realized by pushing the wall-apposition-adjusting wire forward. In the above process, the movable guide wire 10 does not slide relative to the catheter body 2.

As shown in FIG. 5, when the distal end of the movable guide wire 10 is fixed with the distal end of the electrode bracket 1, the electrode bracket 1 can be compacted or expanded by pushing or pulling the movable guide wire 10 forward or backward. During this process, the movable guide wire 10 slides in the catheter body 2.

In the radiofrequency ablation catheter provided by the first embodiment of the invention, by combining the movable guide wire 10 with the radiofrequency ablation catheter, the action of inserting and withdrawing the movable guide wire 10 from the radiofrequency ablation catheter is omitted during the operation, which simplifies the operation of the movable guide wire 10 and facilitates the movement of the radiofrequency ablation catheter during the operation.

Using the above radiofrequency ablation catheter with a movable guide wire, during the operation, the radiofrequency ablation catheter with movable guide wire is directly sent to the target ablation area through the guidance of the soft guide wire 12 at the distal end of the movable guide wire 10, and the radiofrequency ablation catheter is removed from the guide tube or pushed forward, so that the electrode bracket 1 reaches the target ablation area. The electrode bracket 1 self expands due to its own elasticity. According to the structure of the radiofrequency ablation catheter, the expansion of the electrode bracket 1 and the apposition of the electrodes 9 can also be adjusted by the wall-apposition-adjusting wire. Or, after the radiofrequency ablation catheter is removed from the guide tube, the expansion of the electrode bracket 1 can be directly controlled by the wall-apposition-adjusting wire to make the multiple electrodes 9 appress to the wall of the lumen. After ablation, the radiofrequency ablation catheter was withdrawn into the guide tube, and the electrode bracket 2 was contracted using the guide tube. For the radiofrequency ablation catheter which has the distal end of the movable guide wire 10 fixed to the distal end of the electrode bracket 1, the contract and expansion of the electrode holder 1 can be realized by pushing or pulling the movable guide wire 10 forward or backward.

When it is necessary to move the position of the radiofrequency ablation catheter in the blood vessel, the soft guide wire 12 is used to move the radiofrequency ablation catheter to the new target ablation area, and then the guide tube is withdrawn to expand the electrode bracket 1 of the radiofrequency ablation catheter for ablation.

During the above operation, there is no need to insert and withdraw the movable guide wire, which simplifies the operation of the movable guide wire, facilitates the movement of the radiofrequency ablation catheter during the operation, and saves the operation time.

If the shape of the blood vessel bifurcation is special, and thus the soft guide wire 12 is not suitable for entering the target branch blood vessel, using the radiofrequency ablation catheter with the distal end of the movable guide wire 10 not fixed and the proximal end of the movable guide wire 10 fixed on the controlling member 8 outside the control handle 3, the movable guide wire 10 can be pulled out of the catheter body 2 and the control handle 3, to be replaced with a new movable guide wire that has a suitable soft guide wire.

Second Embodiment

Figure 6:
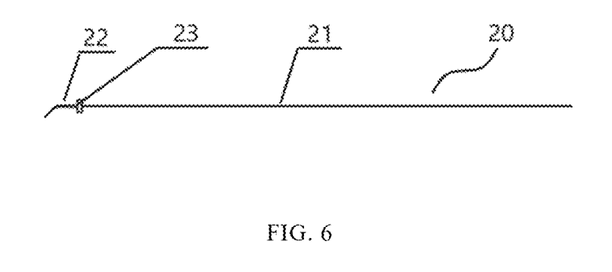
FIG. 6 is an illustrated structural diagram of a movable guide wire in a second embodiment of the radiofrequency ablation catheter described herein, wherein the movable guide wire is provided with a first stop point.
Figure 7:
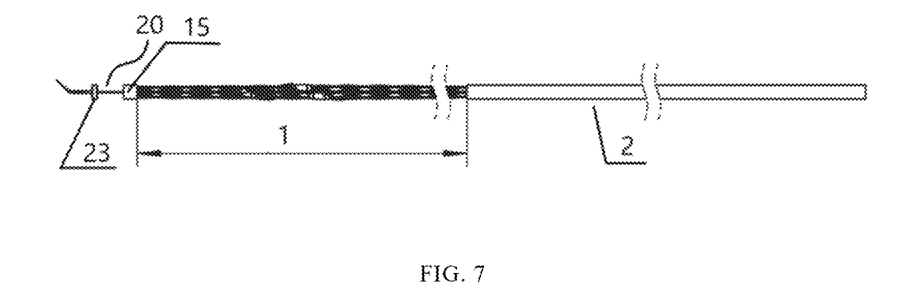
FIG. 7 is an illustrated structural diagram of the second embodiment of the radiofrequency ablation catheter described herein, in which the electrode bracket is in the compact state.
Figure 8:
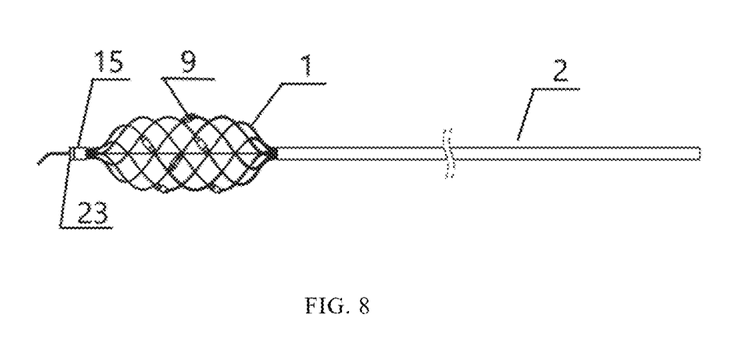
FIG. 8 is an illustrated structural diagram of the second embodiment of the radiofrequency ablation catheter described herein, showing the first stop point is used for expanding the electrode bracket.

As shown in FIGS. 6 to 8, the second embodiment provides a radiofrequency ablation catheter with a movable guide wire, which has a structure similar to that of the first embodiment, wherein the radiofrequency ablation catheter comprises an electrode bracket 1, a catheter body 2 and a control handle 3 arranged in sequence. The catheter body 2 are respectively connected with the electrode bracket 1 and the control handle 3 at opposite ends thereof. The catheter body 2 is provided with a lumen allowing the movable guide wire 20 sliding therein. The distal end of the movable guide wire 20 passes through the catheter body 2 and extends from the distal end of the electrode bracket 1 and is limited outside the distal end of the electrode bracket 1. The proximal end of the movable guide wire 20 passes from the proximal end of the catheter body 2 to the control handle 3, and then the proximal end of the movable guide wire 20 is fixed to the controlling member arranged on the control handle 3 or to the controlling member arranged outside the control handle 3. The movable guide wire 20 moves forward or backward under the action of the controlling member, so that the electrode bracket changes between the compact state and the expanded state.

In this embodiment, except that the structure of the movable guide wire 20 is different from that of the movable guide wire 10 in the first embodiment, the structure of other components is the same as that of the radiofrequency ablation catheter provided in the first embodiment, and will not be described here.

Only the structure and function of the movable guide wire 20 used in the second embodiment are described below.

As shown in FIG. 6, the movable guide wire 20 used in this embodiment has a guide wire body 21 and a soft guide wire 22 arranged at a distal end of the guide wire body 21.

The soft guide wire 22 has a guiding function, which is easy to enter the target branch vessel. The distal end of the soft guide wire 22 extends at an angle of 0-90 degrees. The shape of the distal end of the soft guide wire 22 can be a straight line, a curve, an arc or other shapes, including but not limited to L-shaped, straight shaped or other shapes, which are used to enter different ablation lumens.

The movable guide wire 20 is provided with a first stop point 23, which can be a tube with a diameter greater than the inner diameter of the distal end (the distal connecting tube) of the electrode bracket 1, or a protrusion or a connecting block with a height greater than the inner diameter of the distal end 15 of the electrode bracket 1. As shown in FIG. 7, the first stop point 23 is set at the guide wire body 21 out of the distal end 15 of the electrode bracket 1, and is limited outside the distal end 15 of the electrode bracket 1, so that the soft guide wire 22 at the distal end 15 of the movable guide wire 20 is also limited outside the electrode bracket 1. The first stop point 23 has the function of expanding the electrode bracket 1 to ensure that the electrodes appress to the wall of the lumen.

In this embodiment, since the movable guide wire 20 has the first stop point 23, when the movable guide wire 20 is pulled backward, as shown in FIG. 8, the first stop point 23 moves the distal end 15 of the electrode bracket 1 towards the proximal end of the electrode bracket 1, so that the electrode bracket 1 expands, thereby completing the adhesion action of the electrode 9.

The movable guide wire 20 can cooperate with the guide tube to realize the expanding and contracting of the electrode bracket 1.

Using the above-mentioned radiofrequency ablation catheter with a movable guide wire, under the guidance of the soft guide wire 22 at the distal end of the movable guide wire 20, the radiofrequency ablation catheter with the movable guide wire 20 is directly sent to the target lumen, and the radiofrequency ablation catheter is removed from the guide tube or pushed forward, so that the electrode bracket is exposed to the target ablation area. The electrode bracket 1 expands for its own elasticity. At this time, the expansion of the electrode bracket 1 and the appeasing force to the wall from the electrodes 9 are adjusted by pulling the movable guide wire 20. Or, after the radiofrequency ablation catheter is removed from the guide tube, the expansion of the electrode bracket 1 is directly controlled by using the movable guide wire 20, so that multiple electrodes 9 are appressed to the wall. After ablation, the movable guide wire 20 is pushed forward to release the movable guide wire 20 from blocking the distal end of the electrode bracket 1, and then withdraw the radiofrequency ablation catheter into the guide tube, using the guide tube to contract the electrode bracket 2.

When the position of the radiofrequency ablation catheter needs to be changed in the blood vessel, the soft guide wire 22 is used to move the radiofrequency ablation catheter to the new target ablation area, and then the guide tube is withdrawn, and the electrode bracket 1 of the radiofrequency ablation catheter is expanded by controlling the movable guide wire 20 for ablation.

During the above operation, there is no need to repeat inserting and withdrawing a guide wire, which simplifies the operation of the movable guide wire 20 and facilitates the movement of the radiofrequency ablation catheter during the operation. Moreover, in this embodiment, since the first stop point 23 is located at the distal end of the movable guide wire 20, the movable guide wire 20 functions as a wall-apposition-adjusting wire, and there is no need to a wallapposition-adjusting wire in additional to the movable guide wire 20 in the radiofrequency ablation catheter.

In this embodiment, the electrode bracket 1 is expanded by the first stop point 23 at the distal end of the movable guide wire 20, which is similar to the function achieved by fixing the distal end of the movable guide wire 20 and the distal end 15 of the electrode bracket 1 in the first embodiment. But, compared to the case of fixing the distal end of the movable guide wire 20 and the distal end of the electrode bracket 1, the case of the first stop point 23 at the distal end of the movable guide wire 20 is convenient for installation, and the distal end of the electrode bracket 1 and the distal end of the movable guide wire 20 can slide relatively freely, so that the electrode bracket 1 has better adaptability to blood vessels.

In addition, in this embodiment, the first stop point 23 provided on the movable guide wire 20 can be fixed with the distal end 15 of the electrode bracket 1, so that the movable guide wire 20 has the function of a wall-apposition-adjusting wire. At this time, the function of the movable guide wire 20 is the same as that achieved by fixing the distal end of the movable guide wire 20 and the distal end of the electrode bracket 1 in the first embodiment.

Third Embodiment

Figure 9:
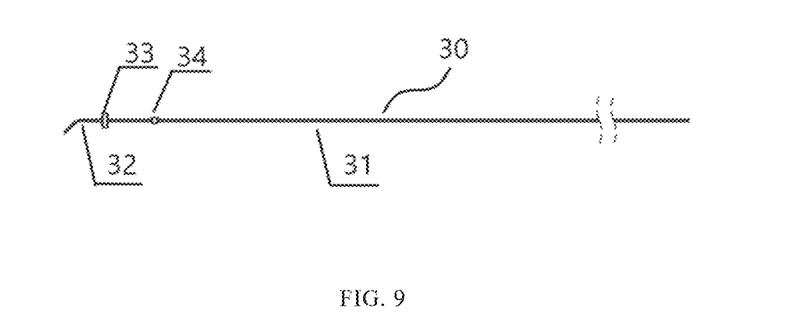
FIG. 9 is an illustrated structural diagram of a third embodiment of the radiofrequency ablation catheter described herein, wherein the movable guide wire is provided with a first stop point and a second stop point.
Figure 10:
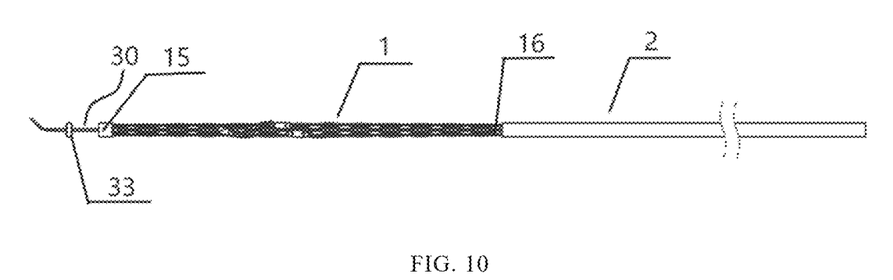
FIG. 10 is an illustrated structural diagram of the third embodiment of the radiofrequency ablation catheter described herein, in which the electrode bracket is in the compact state, and the second stop point is used for depressing the electrode bracket.
Figure 11:
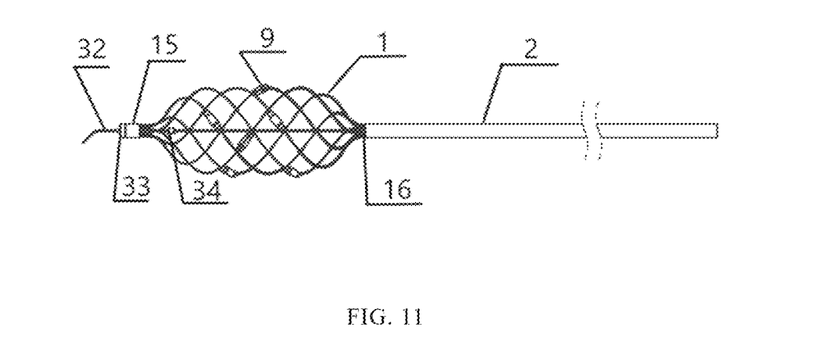
FIG. 11 is an illustrated structural diagram of the third embodiment of the radiofrequency ablation catheter described herein, in which the electrode bracket is in an expanded state, and the first stop point is used to expand the electrode bracket.

As shown in FIGS. 9 to 11, the third embodiment provides a radiofrequency ablation catheter with a movable guide wire function, which has a structure similar to that of the first embodiment. The radiofrequency ablation catheter comprises an electrode bracket 1, a catheter body 2 and a control handle 3 arranged in sequence, and the catheter body 2 are respectively connected with the electrode bracket 1 and the control handle 3 at the opposite ends thereof. A lumen for the movable guide wire 30 sliding in is arranged in the catheter body 2. The distal end of the movable guide wire 30 passes through the catheter body 2 to the distal end of the electrode bracket 1 and is maintained outside the distal end 15 of the electrode bracket 1. The proximal end of the movable guide wire 30 passes from the proximal end of the catheter body 2 to the control handle 3, and is then fixed to the controlling member arranged on the control handle 3 or to the controlling member arranged outside the control handle 3. The movable guide wire 30 moves forward or backward under the action of the controlling member to change the compact state and expanded state of the electrode bracket.

In this embodiment, except that the structure of the movable guide wire 30 is different from that of the movable guide wire 10 in the first embodiment, the structure of other components is the same as that of the radiofrequency ablation catheter provided in the first embodiment, and will not be described here.

Next, only the structure of the movable guide wire 30 used in the third embodiment will be introduced.

As shown in FIG. 9, the movable guide wire 30 in this embodiment has a guide wire body 31 and a soft guide wire 32 arranged at the distal end of the guide wire body 31. The distal soft guide wire 32 has a guiding function to facilitate the movable guide wire 30 access to the target branch blood vessel. The distal end of the soft guide wire 32 extends at an angle of 0-90 degrees. The shape of the distal end of the soft guide wire 32 can be a straight line, a curve, an arc or other shapes, including but not limited to L-shaped, straight shaped or other shapes, so as to enter different ablation lumens.

The movable guide wire 30 is provided with a first stop point 33 and a second stop point 34. The first stop point 33 and the second stop point 34 each can be a tube with a diameter greater than the inner diameter of the distal end 15 of the electrode bracket 1, or a protrusion or a connecting block with a height greater than the inner diameter of the distal end 15 of the electrode bracket 1. The second stop point 34 and the first stop point 33 are set at intervals of a predefined distance. The first stop point 33 is provided at the guide wire body 31 out of the distal end of the electrode bracket 1, and is limited outside the distal end 15 of the electrode bracket 1, so that the soft guide wire 32 provided at the distal end of the movable guide wire 30 is always maintained outside the electrode bracket 1. The first stop point 33 is used to expand the electrode bracket 1. The second stop point 34 is arranged at a part where the guide wire body 31 is parallel to the electrode bracket 1. The second stop point 34 is limited between the distal end 15 and the proximal end 16 of the electrode bracket 1. The second stop point 34 is used to contract the electrode bracket 1.

In this embodiment, the first stop point 33 and the second stop point 34 are arranged on the movable guide wire 30. The first stop point 33 has the function of expanding the electrode bracket to ensure the opposition of the electrodes 9 to the wall. The second stop 34 is used for contracting the electrode bracket 1. When the movable guide wire 30 is pulled backward, as shown in FIG. 11, the first stop point 33 pulls the distal end 15 of the electrode bracket 1 to the direction close to the proximal end 16 of the electrode bracket 1, so that the electrode bracket 1 expands, thereby completing the opposition of the electrode 9 to the wall. When the movable guide wire 30 is pushed forward, as shown in FIG. 10, the second stop point 34 pushes the distal end 15 of the electrode bracket 1 away from the proximal end 16 of the electrode bracket 1, so that the electrode bracket 1 is contracted. In this embodiment, the expanding and contracting of the electrode bracket 1 can be realized by using the movable guide wire alone.

Using the above radiofrequency ablation catheter with a movable guide wire, under the guidance of the soft guide wire 32 at the distal end of the movable guide wire, the radiofrequency ablation catheter with the movable guide wire is directly sent to the target ablation lumen, and the radiofrequency ablation catheter is removed from the guide tube or pushed forward, so that the electrode bracket 1 is in the target ablation area. The electrode bracket 1 self expands for its own elasticity. At this time, the expansion of the electrode bracket 1 and the opposition of the electrode 9 are adjusted by pulling the movable guide wire 30. Or, after the radiofrequency ablation catheter is removed from the guide tube, the expansion of the electrode bracket 1 is directly controlled by using the movable guide wire 30, so that multiple electrodes 9 are appressed to the wall. After ablation, the electrode bracket 1 was contracted by pushing the movable guide wire forward, and then the radiofrequency ablation catheter was withdrawn into the guide tube and out of the body.

When it is necessary to move the position of the radiofrequency ablation catheter in the blood vessel, the soft guide wire 32 is used to move the radiofrequency ablation catheter to the new target ablation area, then the guide tube is withdrawn, and the electrode bracket 1 is expanded by controlling the movable guide wire 30 for ablation.

During the above operation, there is no need to repeat inserting and withdrawing the guide wire, which simplifies the operation of the movable guide wire 30, facilitates the movement of the radiofrequency ablation catheter during the operation, and saves the operation time. Moreover, in this embodiment, by the first stop point 33 and the second stop point 34 at the distal end of the movable guide wire 30, the movable guide wire 30 has the function of a wall-apposition-adjusting wire, and there is no need to a wall-apposition-adjusting wire in addition to the movable guide wire 30 in the radiofrequency ablation catheter.

In this embodiment, by the first stop point 33 and the second stop point 34 at the distal end of the movable guide wire 30, similar functions can be achieved to those achieved by fixing the distal end of the movable guide wire 30 and the distal end of the electrode bracket 1 in the first embodiment. But compared to the case of fixing the distal end of the movable guide wire 30 and the distal end of the electrode bracket 1, the case of the first stop point 33 and the second stop point 34 at the distal end of the movable guide wire 30 is convenient for installation, and has more flexibility for the adjustment of the electrode bracket 1, and the electrode bracket 1 has better adaptability to blood vessels.

Fourth Embodiment

The three embodiments provided by the present invention are described in detail above in combination with the accompanying drawings. In addition to the above three kinds of movable guide wires in the radiofrequency ablation catheter, a movable guide wire with only a second stop point can also be arranged inside the radiofrequency ablation catheter according to the commercial needs. The second stop point is located at where the guide wire body is parallel to the electrode bracket. The second stop point is limited between the distal end and the proximal end of the electrode bracket, and the second stop point is used to contract the electrode bracket.

At this time, the movable guide wire can cooperate with the self-expanding electrode bracket to realize the contracting and expanding of the electrode bracket. By pushing the movable guide wire forward, the electrode bracket can be contracted. By pulling the movable guide wire backward, the restriction of the second stop point to the distal end of the electrode bracket can be removed, and the electrode bracket can self-expands in the lumen. Alternatively, the movable guide wire 20 can also cooperate with the wall-apposition-adjusting wire to realize the expanding and contracting of the electrode bracket.

Above, taking the radiofrequency ablation catheter with mesh stent as an example, the structure of the radiofrequency ablation catheter with a movable guide wire provided by the invention is introduced. The structure of the electrode bracket can also be other structures, such as spiral electrode bracket or basket shaped. A variety of conventional expandable and contractable electrode bracket can be combined with the structure of the movable guide wire provided by the above embodiment, to form a radiofrequency ablation catheter with a movable guide wire. The structure of the movable guide wire can be any of the above embodiments.

To sum up, the radiofrequency ablation catheter with a movable guide wire provided by the invention eliminates the actions of inserting and withdrawing the movable guide wire into and out of the radiofrequency ablation catheter by cooperation of the movable guide wire with the electrode bracket, simplifies the operation of the movable guide wire, and facilitates the movement of the radiofrequency ablation catheter during the operation. During the operation, the target ablation area can be accessed through the soft guide wire at the distal end of the movable guide wire without additional guide wire. After an ablation, it is not necessary to completely extract the radiofrequency ablation catheter, but only to retract the electrode bracket into the guide tube with the soft guide wire exposed outside the guide tube, to facilitate the radiofrequency ablation catheter access to the branch blood vessels. To enter the target branch vessel, it could be realized by moving or rotating the radiofrequency ablation catheter or moving or rotating the active guide wire. By applying the present invention, the operation time will be shortened, and there is no need to insert additional guide wire during the operation, which reduces the cost. More importantly, the radiofrequency ablation catheter can enter the human body for one time, and can be extracted after the ablation treatments to multiple places (left and right sides, or different branches of blood vessels) of the ablation area, without increasing the risk and operation time during the operation.

Moreover, for the improved structure of the movable guide wire, the movable guide wire can function to a wall-apposition-adjusting wire or a supporting wire. By the first stop point and/or the second stop point on the movable guide wire, it could be realized to contract and/or expand the electrode bracket. Thus, the movable guide wire functions as a wall-apposition-adjusting wire. Moreover, by adjusting the strength and hardness of the movable guide wire, the movable guide wire can function as a supporting wire.

The radio frequency ablation catheter with a movable guide wire provided by the invention has been described in detail above. For those skilled in the art, any obvious changes made to the invention without departing from the essence of the invention will constitute an infringement of the patent right of the invention and will bear corresponding legal liabilities.

What is claimed is:

1. A radiofrequency ablation catheter having a movable guide wire, comprising an electrode bracket, a catheter body and a control handle which are arranged in sequence, wherein
   the catheter body has a lumen for the movable guide wire sliding therein; the movable guide wire comprises a guide wire body and a soft guide wire at a distal end of the guide wire body and the soft guide wire being maintained outside the distal end of the electrode bracket;
   the movable guide wire has a first stop point, which is limited outside the distal end of the electrode bracket, and the first stop point is used to expand the electrode bracket; and the movable guide wire has a second stop point limited between the distal end of the electrode bracket and a proximal end of the electrode bracket, and being used for contracting the electrode bracket;
   the movable guide wire extends from the control handle, through the catheter body to the electrode bracket, with a distal end thereof outside the electrode bracket;
   the movable guide wire is controlled by a controlling member in the control handle or outside the control handle;
   the electrode bracket is changeable between a compact state and an expanded state, and is provided with a plurality of electrodes for radiofrequency ablation.

2. The radiofrequency ablation catheter according to claim 1, wherein the electrode bracket has a distal end and a proximal end in shape of a connecting tube, which allows the movable guide wire extending through and movable relative to the electrode bracket to guide the radiofrequency ablation catheter.

3. The radiofrequency ablation catheter according to claim 1, wherein the first stop point is a tube with a diameter greater than an inner diameter of the distal end of the electrode bracket, or a protrusion or a connecting block with a height greater than the inner diameter of the distal end of the electrode bracket.

4. The radiofrequency ablation catheter according to claim 1, wherein the second stop point is a tube with a diameter greater than an inner diameter of the distal end of the electrode bracket, or a protrusion or a connecting block with a height greater than the inner diameter of the distal end of the electrode bracket.

5. The radiofrequency ablation catheter according to claim 1, wherein the soft guide wire has a guiding function to guide the radiofrequency ablation catheter.

6. The radiofrequency ablation catheter according to claim 1, wherein the movable guide wire has a strength enough to support the catheter body.

\* \* \* \* \*